United States Patent
Oyabu

(10) Patent No.: US 8,290,468 B2
(45) Date of Patent: Oct. 16, 2012

(54) METHOD FOR CONTROLLING A HANDOVER THAT SWITCHES CONNECTION FROM A SOURCE BASE STATION APPARATUS TO A DESTINATION BASE STATION APPARATUS, AND CONTROL APPARATUS AND TERMINAL APPARATUS UTILIZING THE SAME

(75) Inventor: Takahiro Oyabu, Gifu (JP)

(73) Assignee: Kyocera Corporation, Kyoto (JP)

( * ) Notice: Subject to any disclaimer, the term of this patent is extended or adjusted under 35 U.S.C. 154(b) by 904 days.

(21) Appl. No.: 12/394,003

(22) Filed: Feb. 26, 2009

(65) Prior Publication Data

US 2009/0154424 A1    Jun. 18, 2009

(30) Foreign Application Priority Data

Feb. 27, 2008    (JP) ................. 2008-046586

(51) Int. Cl.
*H04M 11/00*    (2006.01)
(52) U.S. Cl. ........................................ 455/403
(58) Field of Classification Search .......... 455/403, 455/322.1, 436, 442
See application file for complete search history.

(56) References Cited

U.S. PATENT DOCUMENTS

| | | | | |
|---|---|---|---|---|
| 5,267,261 A * | 11/1993 | Blakeney et al. | ............. | 370/332 |
| 7,321,780 B2 * | 1/2008 | Love et al. | ............. | 455/522 |
| 7,489,655 B2 * | 2/2009 | Chen | ............. | 370/329 |
| 8,094,623 B2 * | 1/2012 | Attar et al. | ............. | 370/332 |
| 2007/0025297 A1 * | 2/2007 | Lee et al. | ............. | 370/331 |
| 2007/0224989 A1 * | 9/2007 | Soong et al. | ............. | 455/436 |
| 2009/0275353 A1 | 11/2009 | Fujita et al. | | |

FOREIGN PATENT DOCUMENTS

| | | |
|---|---|---|
| JP | 2001-128212 | 5/2001 |
| JP | 2003-153327 | 5/2003 |
| WO | WO-2005/041609 | 5/2005 |

OTHER PUBLICATIONS

Notification of Reason(s) for Refusal for JP 2008-046586, mailed Nov. 15, 2011, 2 pages.

* cited by examiner

*Primary Examiner* — Chi Pham
*Assistant Examiner* — Fan Ng
(74) *Attorney, Agent, or Firm* — Duane Morris LLP; Richard C. Kim

(57) ABSTRACT

An interface unit receives a scheduled timing with which to execute a handover and a transmission delay time present in a communication with a terminal apparatus, from the terminal apparatus via a source base station apparatus. A switching control unit sorts out original data, to be transmitted to the terminal apparatus, into first data to be transmitted via the source base station apparatus and second data to be transmitted via a destination base station apparatus, based on the scheduled timing and the transmission delay time received. The interface unit outputs the sorted-out first data to the source base station apparatus and outputs the sorted-out second data to the destination base station apparatus.

10 Claims, 12 Drawing Sheets

METHOD FOR CONTROLLING A HANDOVER THAT SWITCHES CONNECTION FROM A SOURCE BASE STATION APPARATUS TO A DESTINATION BASE STATION APPARATUS, AND CONTROL APPARATUS AND TERMINAL APPARATUS UTILIZING THE SAME

CROSS-REFERENCE TO RELATED APPLICATIONS

This application claims priority under 35 U.S.C. §119 to Japanese Patent Application No. 2008-046586 filed Feb. 27, 2008 in Japan, which is herein incorporated by reference in its entirety.

BACKGROUND OF THE INVENTION

1. Field of the Invention

The present invention relates to a handover control technique and, in particular, to a method for controlling a handover that switches connection from a source base station apparatus to a destination base station apparatus, and a control apparatus and a terminal apparatus utilizing the handover control method.

2. Description of the Related Art

In a wireless communication system, terminal apparatuses are connected to a base station apparatus within a radio zone covered by the base station apparatus. Therefore, if a terminal apparatus moves outside the radio zone, the terminal apparatus may no longer be able to communicate with the base station apparatus. Handover is a technique to avoid such loss of communication. In a handover, therefore, when a terminal apparatus moves from a radio zone into another radio zone, there occurs a switch of the base station apparatus in communication with the terminal apparatus from one covering a first radio zone to another covering a second radio zone (See Reference (1) in Related Art List, for instance).

RELATED ART LIST (1) Japanese Patent Application Publication No. 2003-153327.

In a handover process, a control apparatus in wired communication with a plurality of base station apparatuses executes a flow control processing, thereby stopping the transmission of data to a source base station apparatus and restarting it to a destination base station apparatus after the completion of handover. In such a flow control, a switching processing takes place between the terminal apparatus and the base station apparatuses involved. In addition, the source base station apparatus notifies the control apparatus of the stop of communication, and also the destination base station apparatus notifies the control apparatus of the restart of communication. This creates an ineffectual period from the acceptance of communication stop to the acceptance of communication restart, during which the control apparatus cannot communicate with the terminal apparatus. To enhance convenience for a user, it is desirable that this unproductive period be reduced.

SUMMARY OF THE INVENTION

The present invention has been made in view of the foregoing circumstances, and a general purpose thereof is to provide a communication technology that shortens the period of interrupted communication resulting from a handover.

In order to resolve the above problems, a control apparatus according to one embodiment of the present invention comprises: an input unit which receives a scheduled timing with which to execute a handover and a transmission delay time with a terminal apparatus, from the terminal apparatus via a source base station apparatus; a sorting unit which sorts out original data, to be transmitted to the terminal apparatus, into first data to be transmitted via the source base station apparatus and second data to be transmitted via a destination base station apparatus, based on the scheduled timing and the transmission delay time received by the input unit; and an output unit which outputs the first data sorted out by the sorting unit to the source base station apparatus and which outputs the second data sorted out thereby to the destination base station apparatus.

Another embodiment of the present invention relates to a terminal apparatus. This apparatus comprises: a measurement unit which measures a transmission delay time with a control apparatus routed through a source base station apparatus; a determining unit which determines a scheduled timing with which to execute a handover, based on the transmission delay time measured by the measurement unit; a notification unit which conveys the scheduled timing, with which to execute a handover, determined by the determining unit and the transmission delay time measured by the measurement unit to the control apparatus via the source base station apparatus; and a communication unit which executes communication with the source base station apparatus up to the scheduled timing and with a destination base station apparatus after the scheduled timing.

Still another embodiment of the present invention relates to a method for controlling a handover. This method comprises: receiving a scheduled timing with which to execute the handover and a transmission delay time with a terminal apparatus, from the terminal apparatus via a source base station apparatus; sorting out original data, to be transmitted to the terminal apparatus, into first data to be transmitted via the source base station apparatus and second data to be transmitted via a destination base station apparatus, based on the scheduled timing and the transmission delay time received by the inputting; and outputting the first data sorted out by the sorting to the source base station apparatus and outputting the second data sorted out thereby to the destination base station apparatus.

Still another embodiment of the present invention relates also to a method for controlling a handover. This method comprises: measuring a transmission delay time with a control apparatus routed through a source base station apparatus; determining a scheduled timing with which to execute the handover, based on the transmission delay time measured by the measuring; conveying the scheduled timing, with which to execute the handover, determined by the determining and the transmission delay time measured by the measuring to the control apparatus via the source base station apparatus; and executing communication with the source base station apparatus up to the scheduled timing and with a destination base station apparatus after the scheduled timing.

Optional combinations of the aforementioned constituting elements, and implementations of the invention in the form of methods, apparatuses, systems, recording mediums, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

The present invention will be outlined hereinbelow before it is described in detail. Exemplary embodiments of the present invention relate to a communication system comprised of a PAC (Paging Area Controller), a plurality of base station apparatuses and a terminal apparatus. The terminal apparatus is connected to one of the plurality of base station apparatuses (hereinafter referred to as "source base station apparatus"), and the PAC is generally connected to the plurality of base station apparatuses at one end thereof and to a network at the other end thereof. The PAC performs communications with the terminal apparatus via a source base station apparatus among the plurality of base station apparatuses. The terminal apparatus moves away from a radio zone covered by the source base station apparatus and moves into another radio zone covered by another base station apparatus. Hereinafter, this "another base station apparatus" will be referred to as "destination base station apparatus". In this process, the communication system executes a handover.

In other words, the terminal apparatus starts a communication with the destination base station apparatus after cutting off a communication with the source base station apparatus. And, based on a notification signal from the source base station apparatus or the destination base station apparatus, the PAC makes a switch of the transmission of data to the terminal apparatus and the receiving of data from the terminal apparatus, from the source base station apparatus to the destination base station apparatus. In a handover as described, there is a period or interval during which the terminal apparatus is unable to communicate. For improved convenience of a user, it is desirable that such a disabled period be reduced. To solve this problem, the communication system according to the present exemplary embodiments executes processings as will be described below.

A terminal apparatus measures a transmission delay present in the communication with a PAC via a source base station apparatus. The terminal apparatus also decides on a scheduled timing for a handover, based on the transmission delay time. The terminal apparatus transmits the scheduled timing and transmission delay time to the PAC through the source base station apparatus. The PAC determines a switch timing based on the scheduled timing and transmission delay time. Of data to be transmitted to the terminal apparatus, the PAC outputs a part up to the switch timing to the source base station apparatus and a part after the switch timing to the destination base station apparatus.

Figure 1:
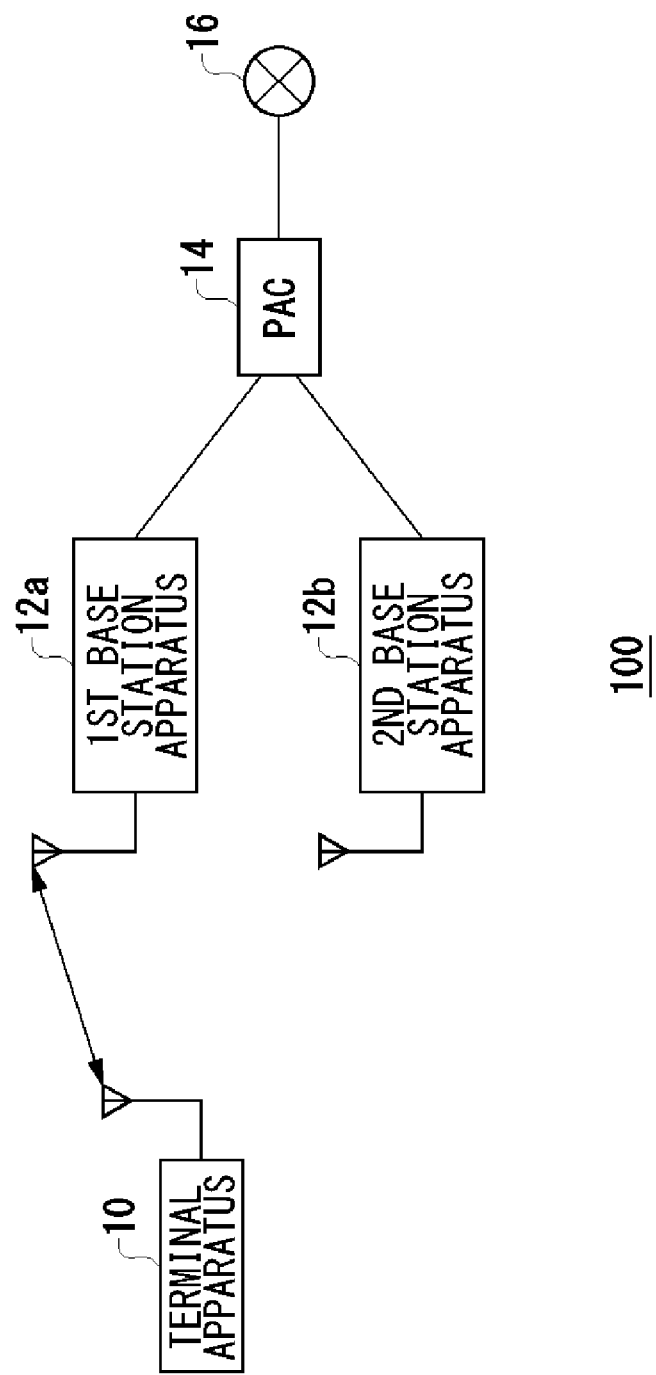
FIG. 1 shows a structure of a communication system according to an exemplary embodiment of the present invention.

FIG. 1 shows a structure of a communication system 100 according to an exemplary embodiment of the present invention. The communication system 100 includes a terminal apparatus 10, a first base station apparatus 12a and a second base station apparatus 12b, which are generically referred to as "base station apparatus 12", a PAC 14, and a network 16. The terminal apparatus 10 is a radio equipment compatible with a predetermined wireless communication scheme. Here, the terminal apparatus 10 possesses not only call functions but also data communication functions. Data communication functions include, for instance, transmission and reception of electronic mail, browsing the World Wide Web (WWW), and using Voice over Internet Protocol (VoIP). And these processings may be executed by the terminal apparatus 10 alone or in connection with a not-shown PC.

The base station apparatus 12 is connected at one end thereof to the terminal apparatus 10 in wireless communication and at the other end thereof to the PAC 14 in wired communication. The base station apparatus 12 is also connected to the network 16 via the PAC 14. Note here that the first base station apparatus 12a corresponds to the source base station apparatus and the second base station apparatus 12b corresponds to the destination base station apparatus. When the terminal apparatus 10 is in communication with the first base station apparatus 12a, either one of them sends out a notification signal for the start of a handover. Thereupon, the terminal apparatus 10 and the first base station apparatus 12a cut off communication with each other, and the terminal apparatus 10 requests a connection to the second base station apparatus 12b. Then the terminal apparatus 10 and the second base station apparatus 12b start a communication with each other. Prior to the start of the handover, the first base station apparatus 12a receives data from the PAC 14 and transmits the data to the terminal apparatus 10. Following the start of the handover, the second base station apparatus 12b receives data from the PAC 14 and transmits the data to the terminal apparatus 10 after the communication with the terminal apparatus 10 is started.

The PAC 14 controls the base station apparatus 12 that is assigned to communicate with the terminal apparatus 10. For example, the PAC 14 receives data destined for the terminal apparatus 10 from the network 16 and transmits the data to the base station apparatus 12 that is in connection with the terminal apparatus 10. In order to implement a processing like this, when the terminal apparatus 10 is connected to the base station apparatus 12, the PAC 14 receives a request for position registration of the terminal apparatus 10 from the base station apparatus 12 and executes the position registration for the terminal apparatus 10. Also, when there has been a change of the base station apparatus 12 connected to the terminal apparatus 10, from the first base station apparatus 12a to the second base station apparatus 12b, the PAC 14 performs the position registration again via the second base station apparatus 12b. Here, the PAC 17 carries out the following processings to shorten the data cutoff period in a handover.

The terminal apparatus 10 measures a transmission delay time present in the communication with the PAC 14 via the first base station apparatus 12a. The terminal apparatus 10 decides on a scheduled timing for a handover, based on the transmission delay time. For example, the scheduled timing for the handover is decided such that it comes after the transmission delay time. The terminal apparatus 10 transmits the scheduled timing and transmission delay time to the PAC 14 through the first base station apparatus 12a. The PAC 14 receives the scheduled timing and transmission delay time, and determines a switch timing accordingly. For example, the PAC 14 determines the switch timing by shifting the scheduled timing forward by the length of the transmission delay time. Of the data received from the network 16, the PAC 14 outputs a part received up to the switch timing, to the first base station apparatus 12a.

The PAC 14 outputs data received after the switch timing to the second base station apparatus 12b. In this manner, the PAC 14 estimates the switch timing and switches the recipients of data according to the estimated switch timing. Thus, the PAC 14 can transmit data before the completion of a handover is confirmed at the terminal apparatus 10, so that the data cutoff period can be shortened. The arrangement may be such that the PAC 14 also receives a signal of scheduled completion timing of handover (hereinafter referred to as "completion timing") from the terminal apparatus 10. In that case, the PAC 14 delays transmission of data to the second base station apparatus 12b by a length of time taking the completion timing into consideration. The network 16 is connected not only to the PAC 14 but also to a not-shown communication apparatus. For example, the network 16 may be an IP (Internet Protocol) network, but is not limited thereto. The network 16 transmits data received from the communication apparatus, to the PAC 14.

Figure 2:
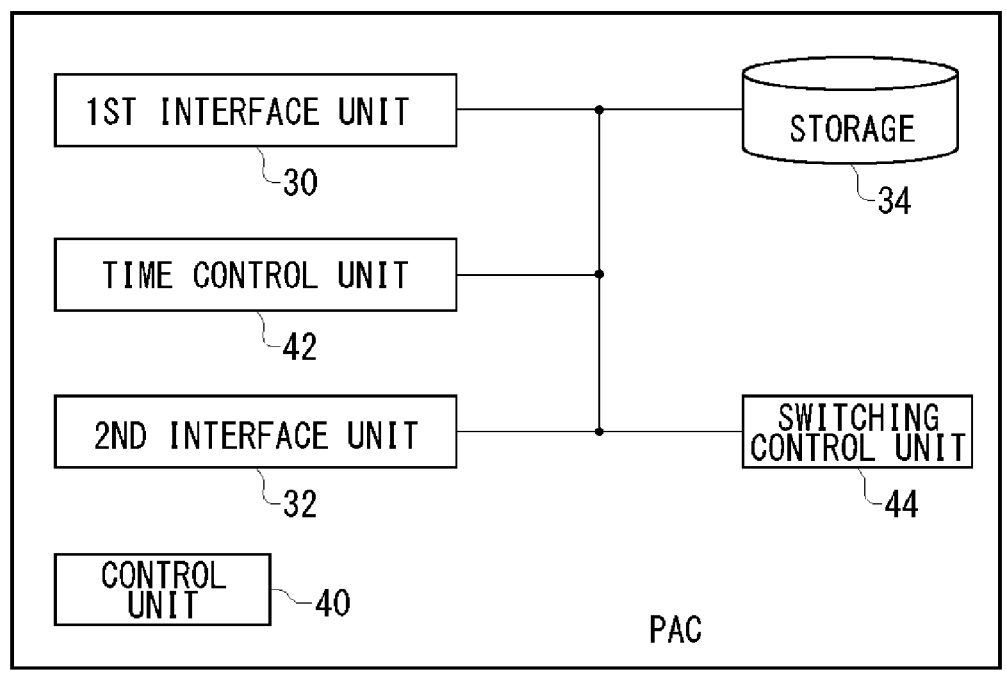
FIG. 2 shows a structure of a PAC shown in FIG. 1.

FIG. 2 shows a structure of the PAC 14. The PAC 14 includes a first interface unit 30, a second interface unit 32, a storage 34, a control unit 40, a time control unit 42, and a switching control unit 44. The first interface unit 30 is an interface with the not-shown network 16. When the network 16 is an IP network, the first interface unit 30 executes processings compatible with IP. For example, the first interface unit 30 receives data destined for a terminal apparatus 10, from a not-shown communication apparatus. Also, the first interface unit 30 may output data received by the second interface unit 32 (described later) to the network 16.

The second interface unit 32 is an interface with not-shown base station apparatuses 12. Here, connected to the second interface unit 32 are a plurality of base station apparatuses 12, which form a paging area. For clarity, the description herein uses two base station apparatuses 12 only. And, when the terminal apparatus 10 is connected to the first base station apparatus 12a, the second interface unit 32 receives a request for position registration of the terminal apparatus 10 from the first base station apparatus 12a. Note that when the terminal apparatus 10 is connected to the second base station apparatus 12b by the execution of a handover, the second interface unit 32 receives a request for position registration of the terminal apparatus 10 from the second base station apparatus 12b. In order to implement the position registration, the second interface unit 32 outputs information on the terminal apparatus 10 and base station apparatus 12 received as the request for position registration, to the storage 34.

The time control unit 42 executes time measurement of a communication channel as instructed from the not-shown terminal apparatus 10, using the second interface unit 32. To put it more specifically, prior to the execution of a handover, the time control unit 42 receives a request for measurement of transmission delay time from the terminal apparatus 10 via the first base station apparatus 12a. The time control unit 42 executes the measurement of transmission delay time for the terminal apparatus 10 via the first base station apparatus 12a. Note here that the time control unit 42 does not measure the transmission delay time directly but assists the measurement by the terminal apparatus 10. For example, if the request for measurement of transmission delay time is a ping, then a response signal thereto is sent back to the terminal apparatus 10. The time control unit 42 may obtain the present time from a not-shown NTP or GPS and transmit the time information to the terminal apparatus 10.

Following this, the time control unit 42, using the second interface unit 32, receives packet signals, which include information on a destination base station apparatus 12, scheduled timing, transmission delay time and completion timing, from the terminal apparatus 10 via the first base station apparatus 12a. The information on the destination base station apparatus 12 corresponds to the information on the second base station apparatus 12a in FIG. 1. The time control unit 42 executes a control of handover timing based on the information contained in the packet signals. In particular, the time control unit 42 determines a switch timing based on the scheduled timing and transmission delay time. As aforementioned, the switch timing is derived, for instance, by shifting the scheduled timing forward by the length of the transmission delay time. The switch timing like this is derived in order to avoid a situation where a handover occurs during a transmission of data to the terminal apparatus 10. The time control unit 42 outputs the switch timing to the switching control unit 44. The time control unit 42 also conveys the scheduled timing to the second base station apparatus 12b via the second interface unit 32.

The switching control unit 44 performs a switching control of the communication route. In particular, the switching control unit 44 sorts out the data, addressed to the terminal apparatus 10, received by the first interface unit 30 into data to be outputted via the first base station apparatus 12a and data to be outputted via the second base station apparatus 12b. To be more specific, the switching control unit 44 performs a control in such a manner as to output data that can be outputted before the switch timing to the first base station apparatus 12a and data thereafter to the second base station apparatus 12b. The second interface unit 32 outputs data to the first base station apparatus 12a or the second base station apparatus 12b, according to the decision by the switching control unit 44. At this time, the second interface unit 32 may delay the output of data to the second base station apparatus 12b in accordance with the completion timing. The storage 34 stores not only the scheduled timing but also the completion timing. Also, the storage 34 stores the route before the change in the handover but also the route after it. The control unit 40 controls the operation of the PAC 14 as a whole.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 3:
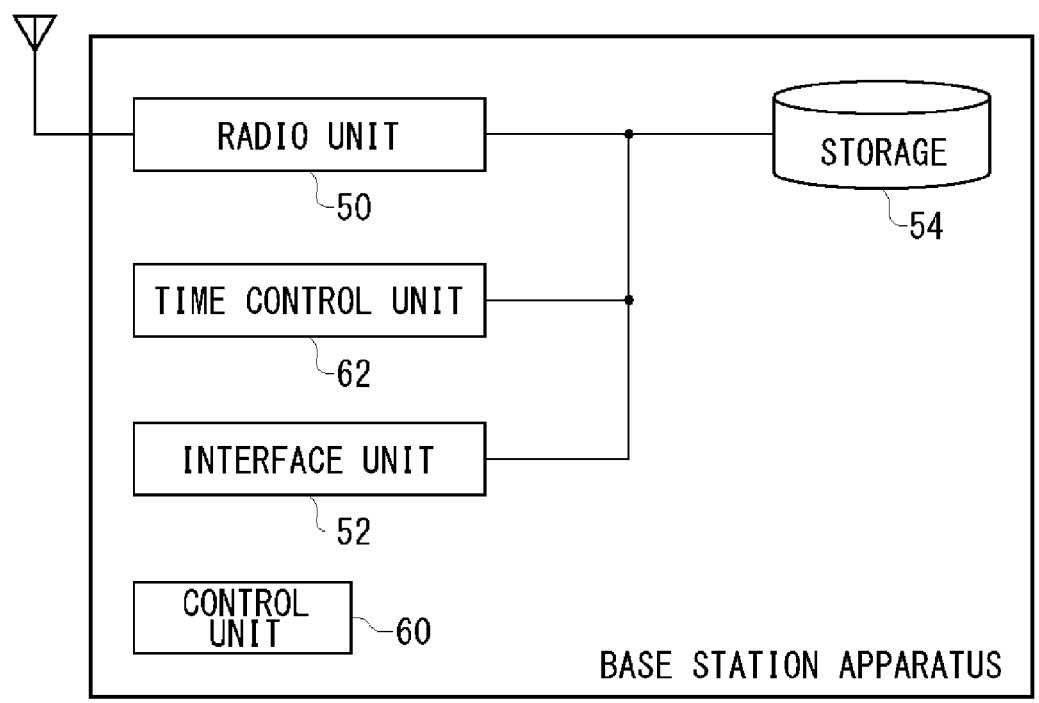
FIG. 3 shows a structure of a base station apparatus shown in FIG. 1.

FIG. 3 shows a structure of the base station apparatus 12. The base station apparatus 12 includes a radio unit 50, an interface unit 52, a storage 54, a control unit 60, and a time control unit 62. The interface unit 52 is an interface with a PAC 14. The interface unit 52 executes processings corresponding to the second interface unit 32 of FIG. 2. Here, the interface unit 52 receives data destined for a terminal apparatus 10, from the not-shown PAC 14. Also, the interface unit 52 outputs data sent from the terminal apparatus 10, to the PAC 14.

The radio unit 50 performs wireless communication with the terminal apparatus 10. The wireless communication scheme to be employed between the radio unit 50 and the terminal apparatus 10 may be arbitrary. In a communication with the terminal apparatus 10, the radio unit 50 of the first base station apparatus 12a will discontinue the communication with the terminal apparatus if it receives a request for cutoff from the terminal apparatus 10 in a scheduled timing. On the other hand, when the radio unit 50 of the second base station apparatus 12b receives a request for connection from the terminal apparatus 10, the control unit 60 assigns a communication channel to the terminal apparatus 10. Then the radio unit 50 performs communication with the terminal apparatus 10. Note that various steps, including authentication, are taken before the execution of communication, but the description thereof is omitted here.

The storage 54 stores information on the communication channel assigned to the terminal apparatus 10. The time control unit 62 executes time measurement of the communication channel between the terminal apparatus 10 and the PAC 14. The time control unit 62, when it receives a request for measurement of transmission delay time from the terminal apparatus 10 via the radio unit 50, outputs the request from the interface unit 52 to the PAC 14. Also, the time control unit 62, when it receives a response from the PAC 14 via the interface 52, outputs the response from the radio unit 50 to the terminal apparatus 10. The time control unit 62 of the second base station apparatus 12b receives information on the scheduled timing from the PAC 14 via the interface unit 52. With the arrival of the scheduled timing, the control unit 60 of the second base station apparatus 12b assigns a communication channel to the terminal apparatus 10 in response to the request for connection from the terminal apparatus 10. The control unit 60 controls the timing of the base station apparatus 12 as a whole.

Figure 4:
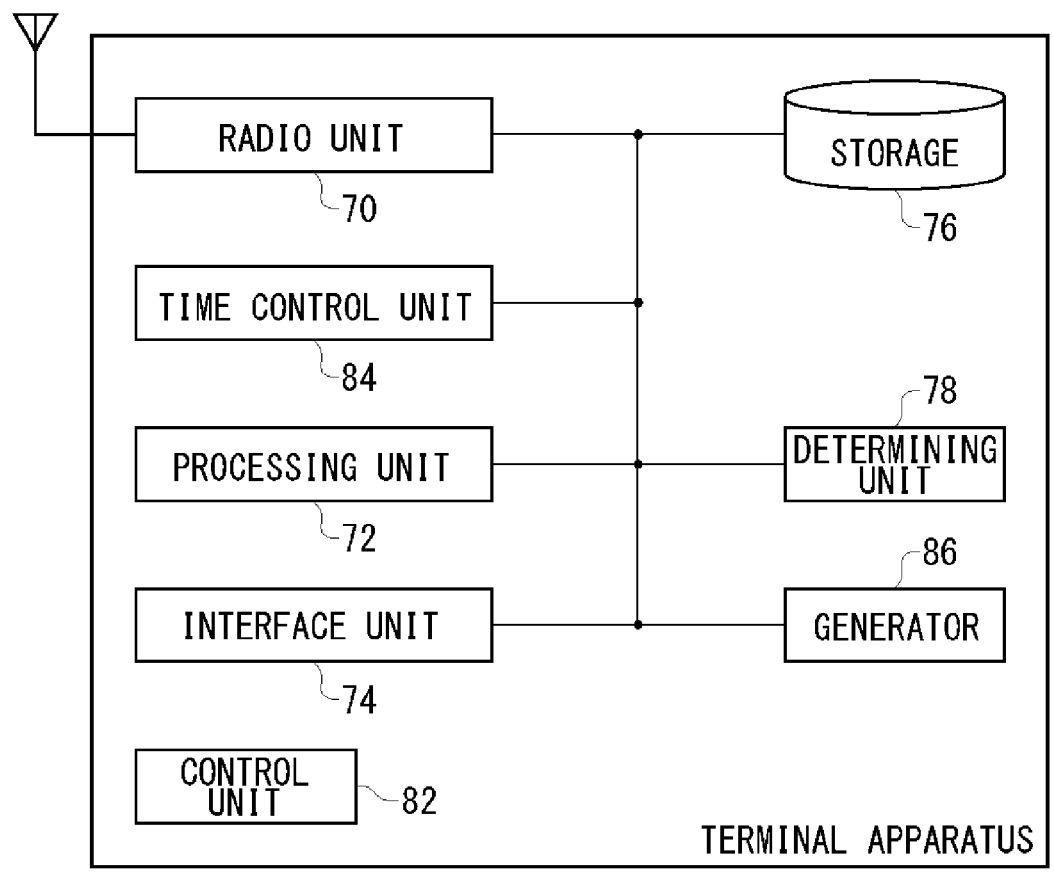
FIG. 4 shows a structure of a terminal apparatus shown in FIG. 1.

FIG. 4 shows a structure of the terminal apparatus 10. The terminal apparatus 10 includes a radio unit 70, a processing unit 72, an interface unit 74, a storage 76, a determining unit 78, a control unit 82, a time control unit 84, and a generator 86. The interface unit 74 receives inputs from the user. For example, the interface unit 74, which is structured by buttons or the like, receives an instruction from a user as he/she presses the button down. The processing unit 72 controls the operation of communication applications. The communication applications are call function, electronic mail function, and so forth.

The radio unit 70 performs wireless communication with a base station apparatus 12. The radio unit 70 executes processings corresponding to the radio unit 50 of FIG. 3. The time control unit 84 executes time measurement of the communication channel. To put it more specifically, the time control unit 84, as described earlier, transmits a request for measurement of transmission delay time to the PAC 14 via the radio unit 70 and the first base station apparatus 12a. The time control unit 84 receives a response from the PAC 14 via the radio unit 70 and the first base station apparatus 12a. The time control unit 84 derives a transmission delay time based on the response received. For example, if the request for measurement of transmission delay time is a ping, the time control unit 84 determines ½ of the ping response time to be the transmission delay time.

The time control unit 84 also determines a scheduled timing based on the measured transmission delay time. That is, the time control unit 84 determines the scheduled timing such that it comes before the timing of transmission delay time. For example, when the frame period is defined as 5 msec, the time control unit 84 may determine the scheduled timing to be "N frames later". In such a case, if the timing error is 5 msec or less, the error can be absorbed by the slot timing, so that the scheduled timing may be determined in absolute time. The time control unit 84 determines a completion timing, by taking its own processing capacity into consideration, such that the completion timing comes after the scheduled timing. Here, the time control unit 84 may determine the completion timing by adding a predefined fixed value to the scheduled timing.

The generator 86 generates a message to the PAC 14. The message contains information on a destination base station apparatus 12, scheduled timing, transmission delay time, and completion timing. The radio unit 70 conveys the message generated by the generator 86 to the PAC 14 via the first base station apparatus 12a. The storage 76 stores the scheduled timing. The determining unit 78 determines the execution of a handover in the scheduled timing stored in the storage 76. Also, the determining unit 78 gives an instruction to the radio unit 70 to execute a handover. As a result, the radio unit 70 conducts communication with the first base station apparatus 12a up to the scheduled timing and with the second base station apparatus 12b after it. With the arrival of the scheduled timing, the radio unit 70 transmits a request for connection to the second base station apparatus 12b. The control unit 82 controls the operation of the terminal apparatus 10 as a whole.

Figure 5:
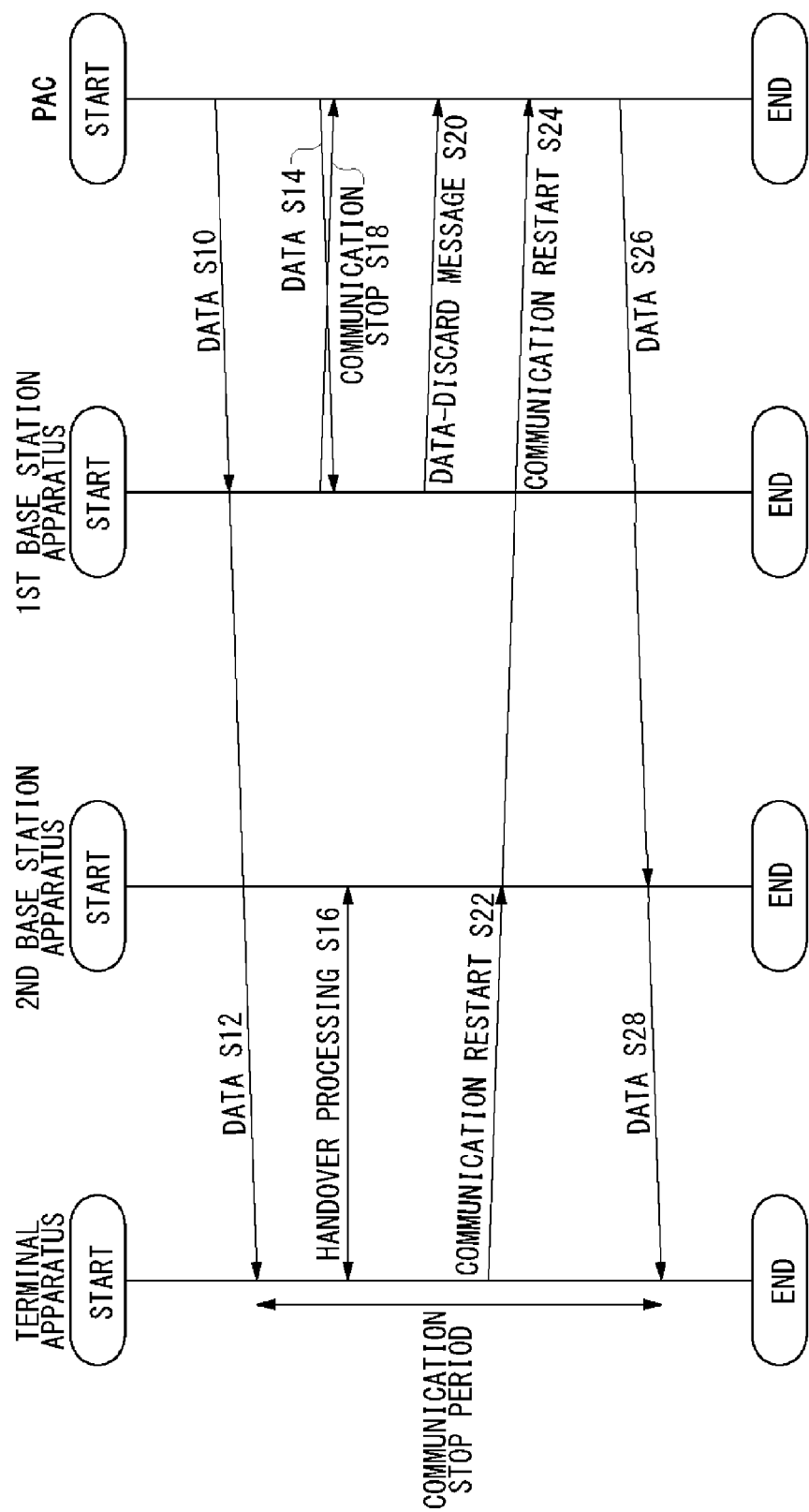
FIG. 5 is a sequence diagram showing a handover procedure in a communication system to be compared with the communication system of FIG. 1.

A description will now be given of an operation of the communication system 100 implementing the structure as described above. FIG. 5 is a sequence diagram showing a handover procedure in a communication system to be compared with the communication system 100. The PAC transmits data to the first base station apparatus (S10), and the first base station apparatus transmits data to the terminal apparatus (S12). The PAC again transmits data to the first base station apparatus (S14), but in the meantime, a handover processing is executed between the terminal apparatus and the second base station apparatus (S16), and the first base station apparatus conveys a communication stop to the PAC (S18). Following this, the first base station apparatus transmits a data-discard message to the PAC (S20). The terminal apparatus conveys a communication restart to the second base station apparatus (S22), and the second base station apparatus conveys the communication restart to the PAC (S24). The PAC transmits data to the second base station apparatus (S26), and the second base station apparatus transmits data to the terminal apparatus (S28). During the processings described above, there is a communication stop period for the terminal apparatus 10 as indicated by an vertical double-arrowed line.

Figure 6:
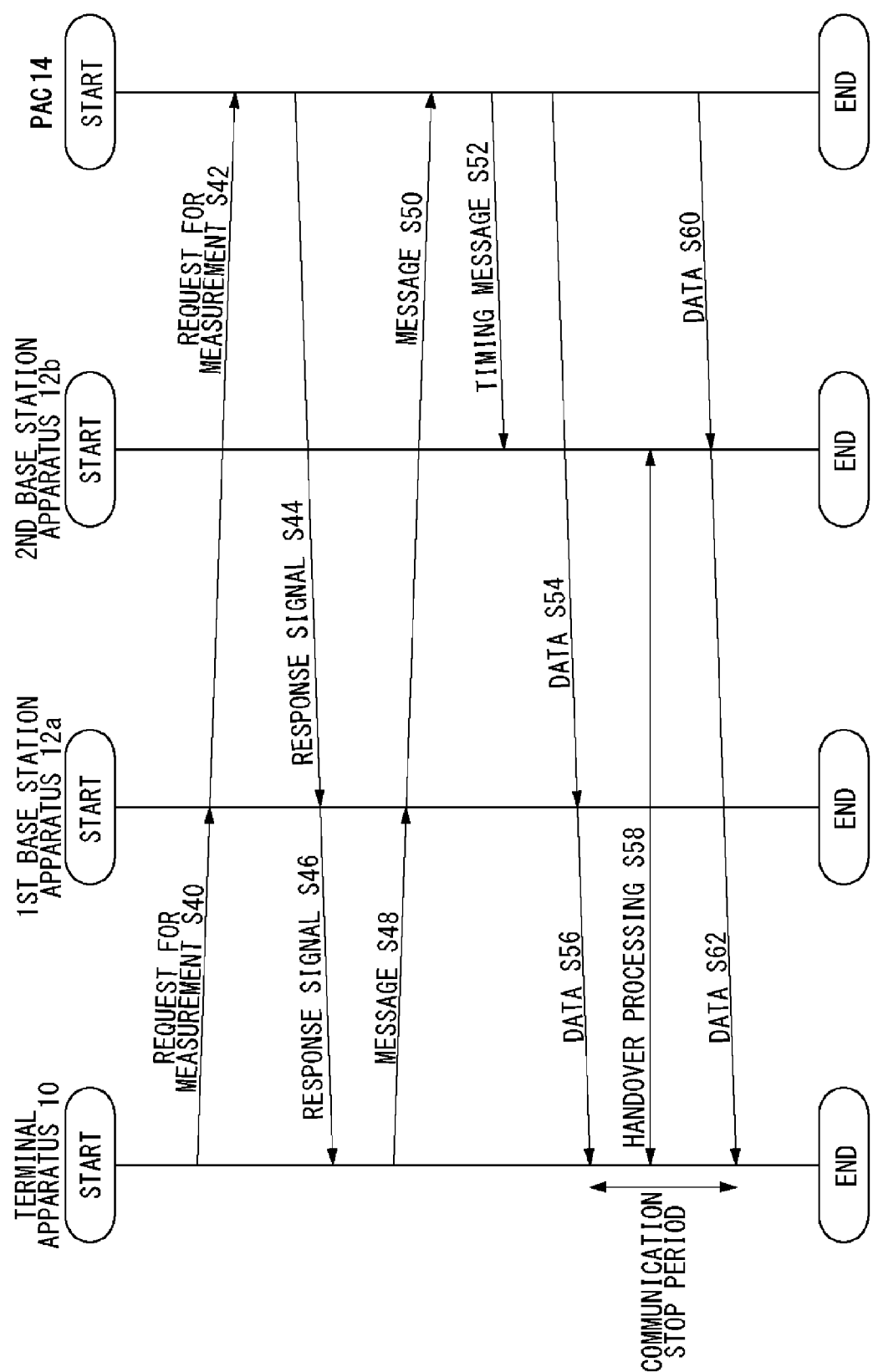
FIG. 6 is a sequence diagram showing a handover procedure in the communication system of FIG. 1.

FIG. 6 is a sequence diagram showing a handover procedure in the communication system 100. The terminal apparatus 10 transmits a request for measurement to the first base station apparatus 12a (S40), and the first base station apparatus 12a transmits the request for measurement to the PAC 14 (S42). The PAC 14 transmits a response signal to the first base station apparatus 12a (S44), and the first base station apparatus 12a transmits the response signal to the terminal apparatus 10 (S46). The terminal apparatus 10 transmits a message to the first base station apparatus 12a (S48), and the first base station apparatus 12a transmits the message to the PAC 14 (S50). The PAC 14 conveys a scheduled timing contained in the message to the second base station apparatus 12b (S52).

The PAC 14 transmits data to the first base station apparatus 12a until the switch timing (S54), and the first base station apparatus 12a transmits the data to the terminal apparatus 10 (S56). A handover processing is executed between the terminal apparatus 10 and the second base station apparatus 12b (S58). After the switch timing, the PAC 14 transmits data to the second base station apparatus 12b (S60), and the second base station apparatus 12b transmits the data to the terminal apparatus 10 (S62). During the processings described above, there is a communication stop period for the terminal apparatus 10 as indicated by a vertical double-arrowed line. Note, however, that the communication stop period is shorter than the one of FIG. 5.

Figure 7:
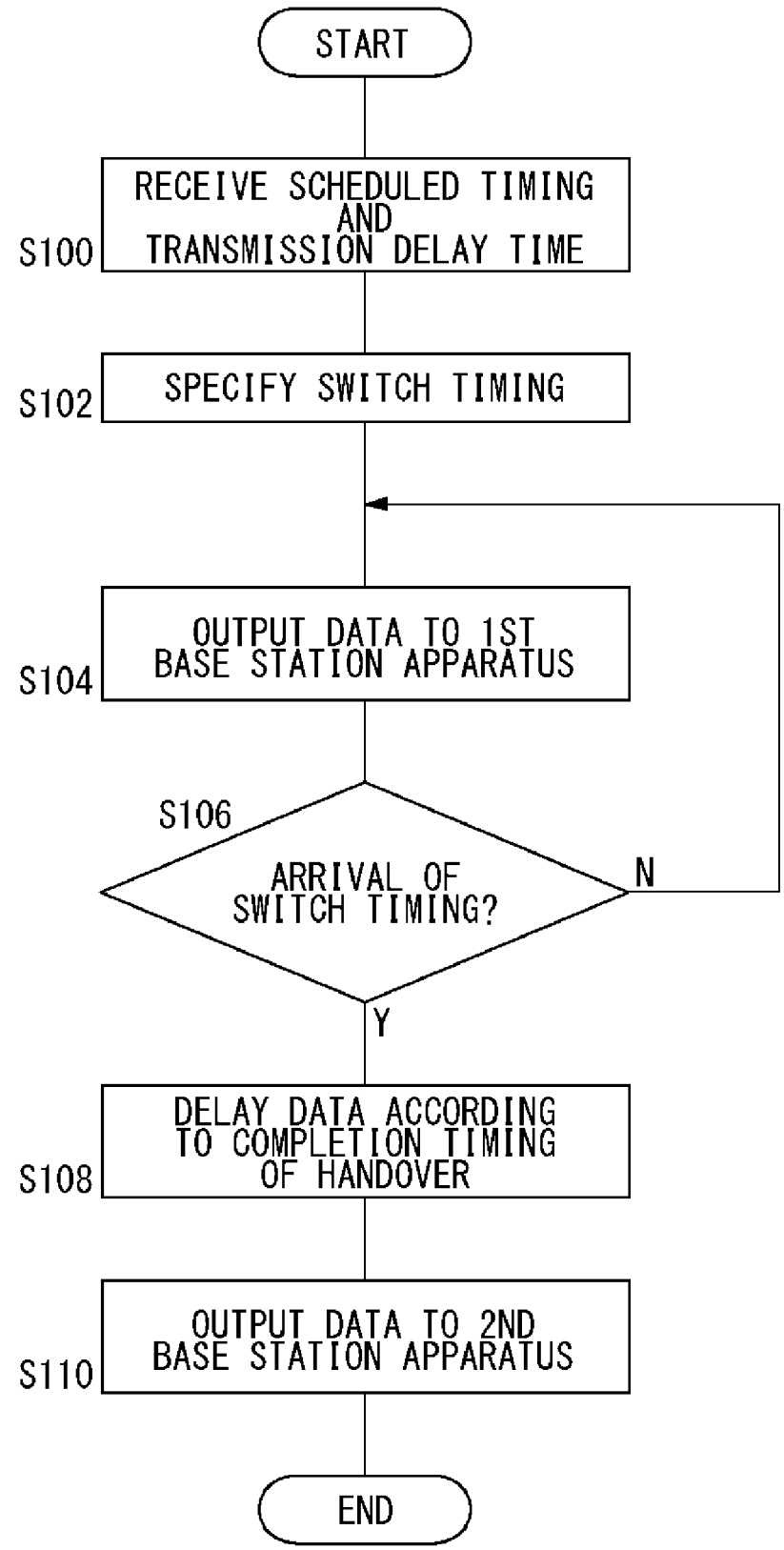
FIG. 7 is a flowchart showing a handover procedure by the PAC of FIG. 2.

FIG. 7 is a flowchart showing a handover procedure by the PAC 14. The second interface unit 32 receives a scheduled timing and transmission delay time (S100). The time control unit 42 specifies a switch timing (S102). The second interface unit 32 outputs data to the first base station apparatus 12a (S104). Without the arrival of the switch timing (N of S106), the processing returns to Step 104. On the other hand, with the arrival of the switch timing (Y of S106), the second interface unit 32 delays the dispatch of data according to the completion timing of handover (S108) and then outputs the data to the second base station apparatus 12b (S110).

Figure 8:
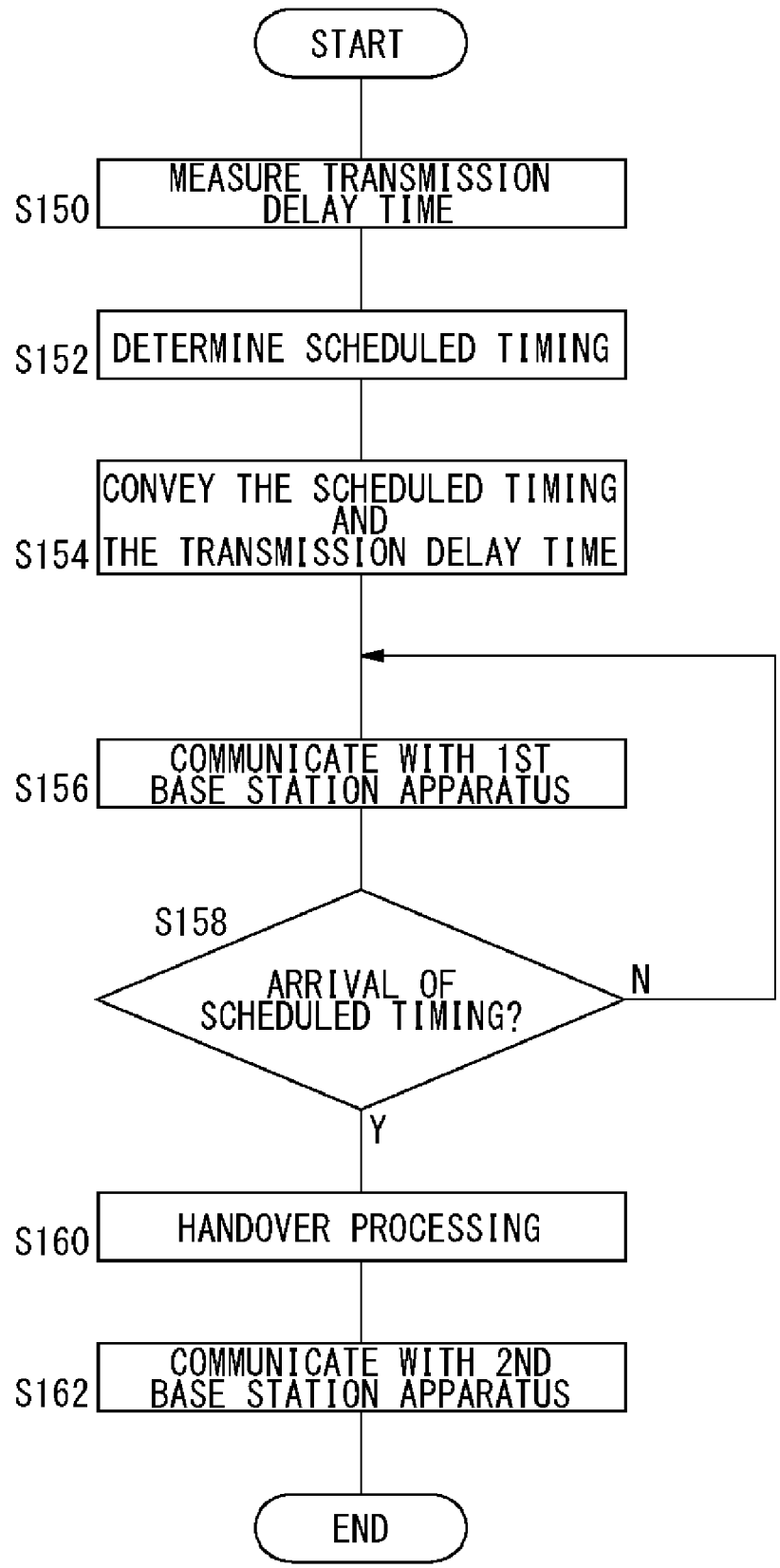
FIG. 8 is a flowchart showing a handover procedure by the terminal apparatus of FIG. 4.

FIG. 8 is a flowchart showing a handover procedure by a terminal apparatus 10. The time control unit 84 measures a transmission delay time (S150). The time control unit 84 determines a scheduled timing (S152). The generator 86 conveys the scheduled timing and the transmission delay time to the PAC 14 via the radio unit 70 (S154). The radio unit 70 executes a communication with the first base station apparatus 12a (S156). Without the arrival of the scheduled timing (N of S158), the processing returns to Step 156. With the arrival of the scheduled timing (Y of S158), the radio unit 70 executes a handover processing (S160) and executes a communication with the second base station apparatus 12b (S162).

Hereinbelow, a modification of the exemplary embodiment will be described. The modification, as with the above-described exemplary embodiment, relates to a communication system in which a terminal apparatus performs a handover. In the exemplary embodiment, a terminal apparatus executes a handover from a source base station apparatus to a destination base station apparatus. The modification, on the other hand, deals with situations where the terminal apparatus fails in a handover to the destination base station apparatus. In particular, the modification has an objective of shortening the communication down time when the terminal apparatus is connected to a new base station apparatus after a failure in handover. At a stage before a handover, the PAC according to the modification receives not only information on the destination base station apparatus but also information on a next available destination base station apparatus (hereinafter referred to as "substitute base station apparatus") and the processing speed of the terminal apparatus from the terminal apparatus.

The PAC assumes that when a connection between the destination base station apparatus and the terminal apparatus has ended in a failure, a connection processing takes place between the terminal apparatus and a substitute base station apparatus. Also, the PAC, which stores in advance the relationship between the processing speed of the terminal apparatus and the period required for a handover, determines a period required for a handover based on the information on the processing speed received from the terminal apparatus. Further, the PAC transmits data to the substitute base station apparatus in accordance with the period required for the handover. It is to be noted that the data to be transmitted to the substitute base station apparatus is, in essence, the data to be transmitted to the destination base station apparatus.

The communication system 100 according to the modification is basically the same as the communication system 100 of FIG. 1, but further includes a third base station apparatus 12c corresponding to the above-described substitute base station apparatus. Also, the base station apparatus 12 according to the modification has the same structure as one shown in FIG. 3, so that the description thereof is omitted here. Also, the PAC 14 and the terminal apparatus 10 according to the modification are of the same structures as the ones shown in FIG. 2 and FIG. 4, respectively, so that only the differences will be mainly described hereinbelow.

The PAC 14 has the same structure as that of the one shown in FIG. 2. The PAC 14 according to the modification executes the following processings in addition to those of the PAC 14 of FIG. 2. Prior to a handover, the time control unit 42, using the second interface unit 32, receives aforementioned packet signals, or a message, from the terminal apparatus 10 via the first base station apparatus 12a. The message contains not only information on the destination base station apparatus 12 but also information on at least one subsequent destination base station apparatus 12 (hereinafter referred to as "substitute base station apparatus 12") and the processing speed of the terminal apparatus 10 (hereinafter referred to as "apparatus class"). The apparatus class is defined, for instance, according to the speed of a not-shown CPU provided in the terminal apparatus 10. Also, presented as the substitute base station apparatus 12 is the third base station apparatus 12c, which is not shown in FIG. 1.

Then the time control unit 42 executes a handover processing for the terminal apparatus 10 the same way as in the above-described exemplary embodiment. More specifically, a handover from the first base station apparatus 12a to the second base station apparatus 12b is executed. The time control unit 42 now detects a failure in connection between the second base station apparatus 12b and the terminal apparatus 10, using the second interface unit 32. The connection failure is detected as follows. At the final stage of handover processing, the second interface unit 32 outputs data to the second base station apparatus 12b. If connection between the second base station apparatus 12b and the terminal apparatus 10 is not completed, that is, if a handover processing fails, then the second base station apparatus 12b will transmit a non-connection message to the PAC 14. The time control unit 42 recognizes the non-connection message as a connection failure.

Figure 9:
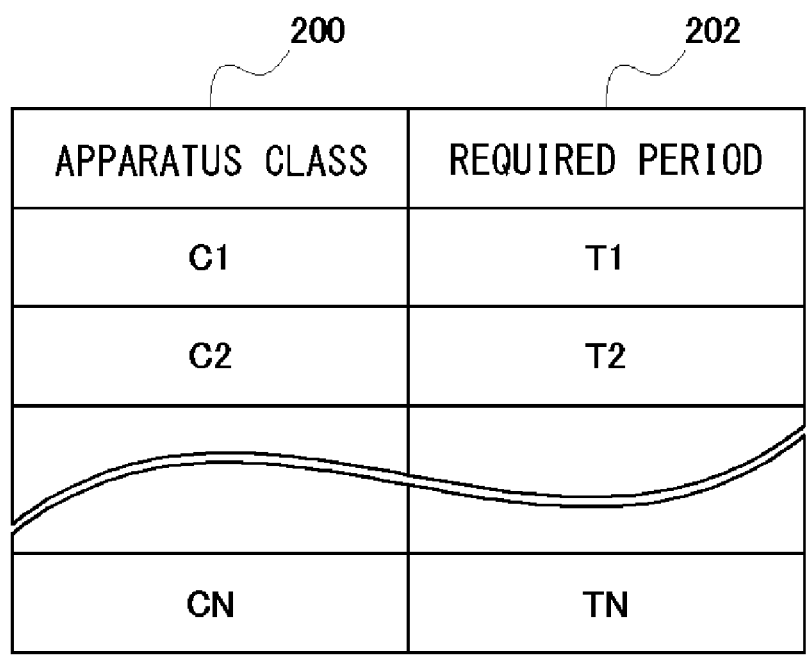
FIG. 9 shows a data structure of a table stored in a time control unit according to a modification of an exemplary embodiment.

Upon detection of the connection failure, the time control unit 42 identifies a "substitute base station apparatus 12" from the previously received message. Here, the third base station apparatus 12c is identified as the substitute base station apparatus 12. The time control unit 42 also identifies a period required for a handover (hereinafter referred to as "required period") from the apparatus class. FIG. 9 shows a data structure of a table stored in the time control unit 42 according to the modification of the exemplary embodiment. As shown in FIG. 9, the table has an apparatus class column 200 and a required period column 202. Contained in the apparatus class column 200 are values "C1", "C2" and the like corresponding to the processing speeds, and contained in the required period column 202 are the values of period "T1", "T2" and the like corresponding to the values "C1", "C2" and the like. Note that the higher the processing speed is, the shorter the required period tends to be, with "C1" representing the highest processing speed and "T1" the shortest required period. Refer back to FIG. 2.

The time control unit 42 determines a required period based on the apparatus class by referring to the table as shown in FIG. 9. The time control unit 42 also determines a timing for starting data output to the third base station apparatus 12c (hereinafter referred to as "restart timing") by adding the identified required period to the present time. The restart timing corresponds to a timing representing a delay from the present time by the required period. The time control unit 42 outputs the restart timing and information on the third base station apparatus 12c to the switching control unit 44.

The switching control unit 44 receives the restart timing and information on the third base station apparatus 12c from the time control unit 42. In the aforementioned switch timing, the switching control unit 44 keeps the data outputted to the second base station apparatus 12b from when the data are outputted to the second base station apparatus 12b until when the completion of connection between the second base station apparatus 12b and the terminal apparatus 10 is confirmed. With the arrival of the restart timing, the switching control unit 44 outputs data to the third base station apparatus 12c via the second interface unit 32. At this time, the switching control unit 44 also outputs the stored data, which are the data already outputted to the second base station apparatus 12b, to the third base station apparatus 12c. This is equal to delaying the output after the switch timing based on the required period.

The terminal apparatus 10 has the same structure as that of the one shown in FIG. 4. The terminal apparatus 10 according to the modification executes the following processings in addition to those of the terminal apparatus 10 of FIG. 4. The radio unit 70, when connected to the first base station apparatus 12a, receives control signals sent from other base station apparatuses 12. Then the radio unit 70 selects a base station apparatus 12 corresponding to the received control signal as a candidate for the destination base station apparatus 12. Note that when a plurality of base station apparatuses 12 are selected as candidates for the destination base station apparatus 12, the radio unit 70 may, for example, measure the respective received powers of the control signals and select a base station apparatus 12 corresponding to the control signal with the largest received power as the destination base station apparatus 12.

Further, the radio unit 70 may select a base station apparatus 12 corresponding to the control signal with the second largest received power as the substitute base station apparatus 12. The assumption herein is such that the second base station apparatus 12b is selected as the destination base station apparatus 12, and the third base station apparatus 12c as the substitute base station apparatus 12. The radio unit 70 outputs such decisions to the generator 86 and the determining unit 78. It is to be noted that the radio unit 70 may output the decisions to other constituent elements as necessary.

The generator 86 generates a message as described previously. The message meant here includes not only information on the destination base station apparatus 12 but also information on the substitute base station apparatus 12 and the apparatus class. Note that information on the apparatus class is stored in the storage 76 in advance, and the generator 86 references the storage 76 when generating the message. The generator 86 outputs the generated message to the radio unit 70. The radio unit 70 conveys the message generated by the generator 86 to the PAC 14 via the first base station apparatus 12a.

As described earlier, the determining unit 78 and the radio unit 70 execute processings for a handover to the second base station apparatus 12b. However, if the handover processing to the second base station apparatus 12b ends in a failure due to certain factors, then the determining unit 78 will decide on a handover to the third base station apparatus 12c and instruct the radio unit 70 to that effect. The radio unit 70 transmits a request for connection to the third base station apparatus 12c according to the instruction from the determining unit 78. The processings following this are the same as those already described, so that the description thereof is omitted here.

Figure 10:
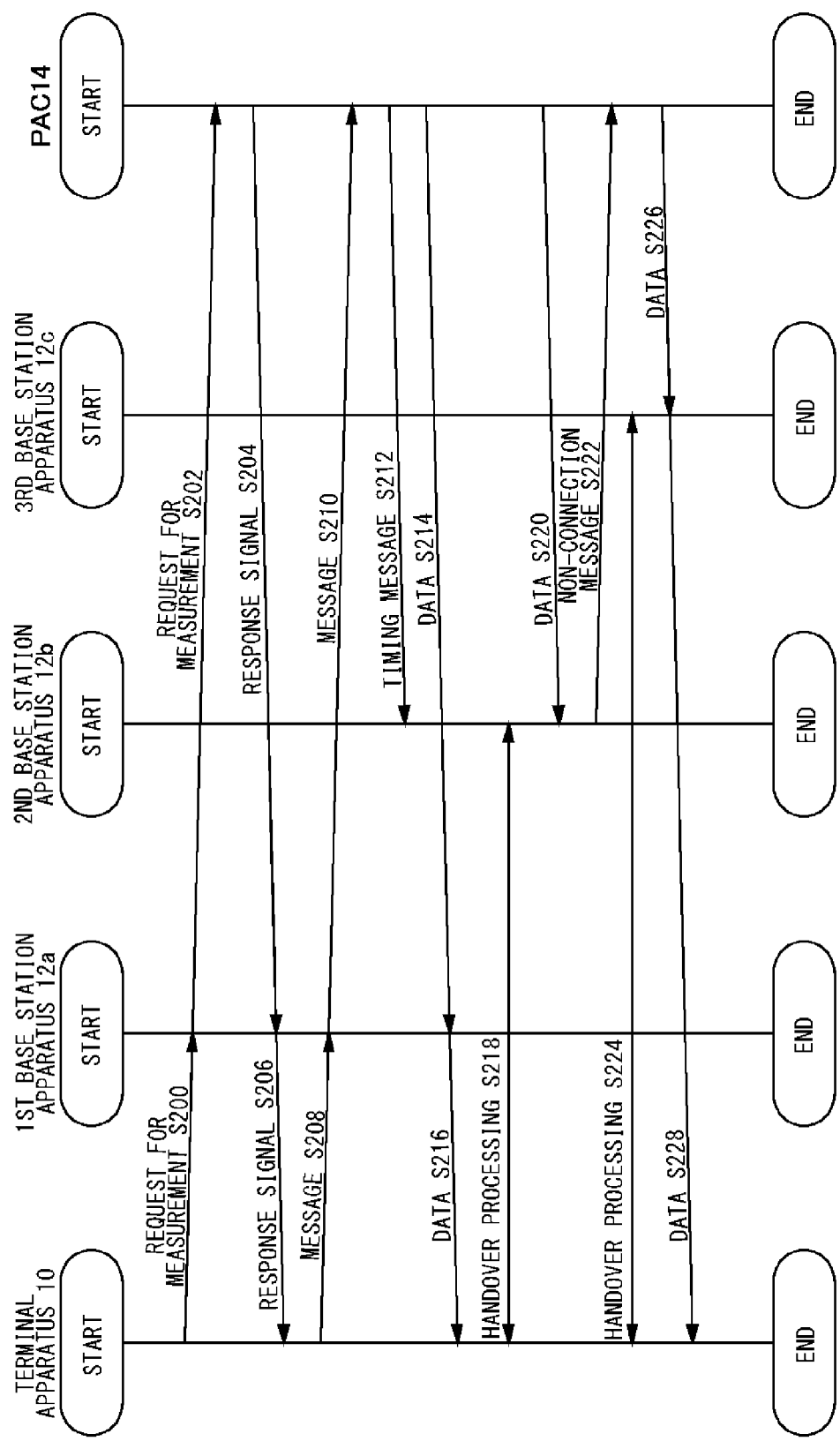
FIG. 10 is a sequence diagram showing a handover procedure in a communication system according to a modification of an exemplary embodiment.

FIG. 10 is a sequence diagram showing a handover procedure in the communication system 100 according to a modification of the exemplary embodiment. The terminal apparatus 10 transmits a request for measurement to the first base station apparatus 12a (S200), and the first base station apparatus 12a transmits the request for measurement to the PAC 14 (S202). The PAC 14 transmits a response signal to the first base station apparatus 12a (S204), and the first base station apparatus 12a transmits the response signal to the terminal apparatus 10 (S206). The terminal apparatus 10 transmits a message to the first base station apparatus 12a (S208), and the first base station apparatus 12a transmits the message to the PAC 14 (S210). The PAC 14 conveys a scheduled timing contained in the message to the second base station apparatus 12b (S212).

The PAC 14 transmits data to the first base station apparatus 12a until the switch timing (S214), and the first base station apparatus 12a transmits the data to the terminal apparatus 10 (S216). A handover processing is executed between the terminal apparatus 10 and the second base station apparatus 12b (S218). After the switch timing, the PAC 14 transmits data to the second base station apparatus 12b (S220). However, the handover processing ends in a failure, so that the second base station apparatus 12 transmits a non-connection message to the PAC 14 (S222). Then a handover processing is executed between the terminal apparatus 10 and the third base station apparatus 12c (S224). After the restart timing, the PAC 14 transmits data to the third base station apparatus 12c (S226), and the third base station apparatus 12c transmits the data to the terminal apparatus 10 (S228).

Figure 11:
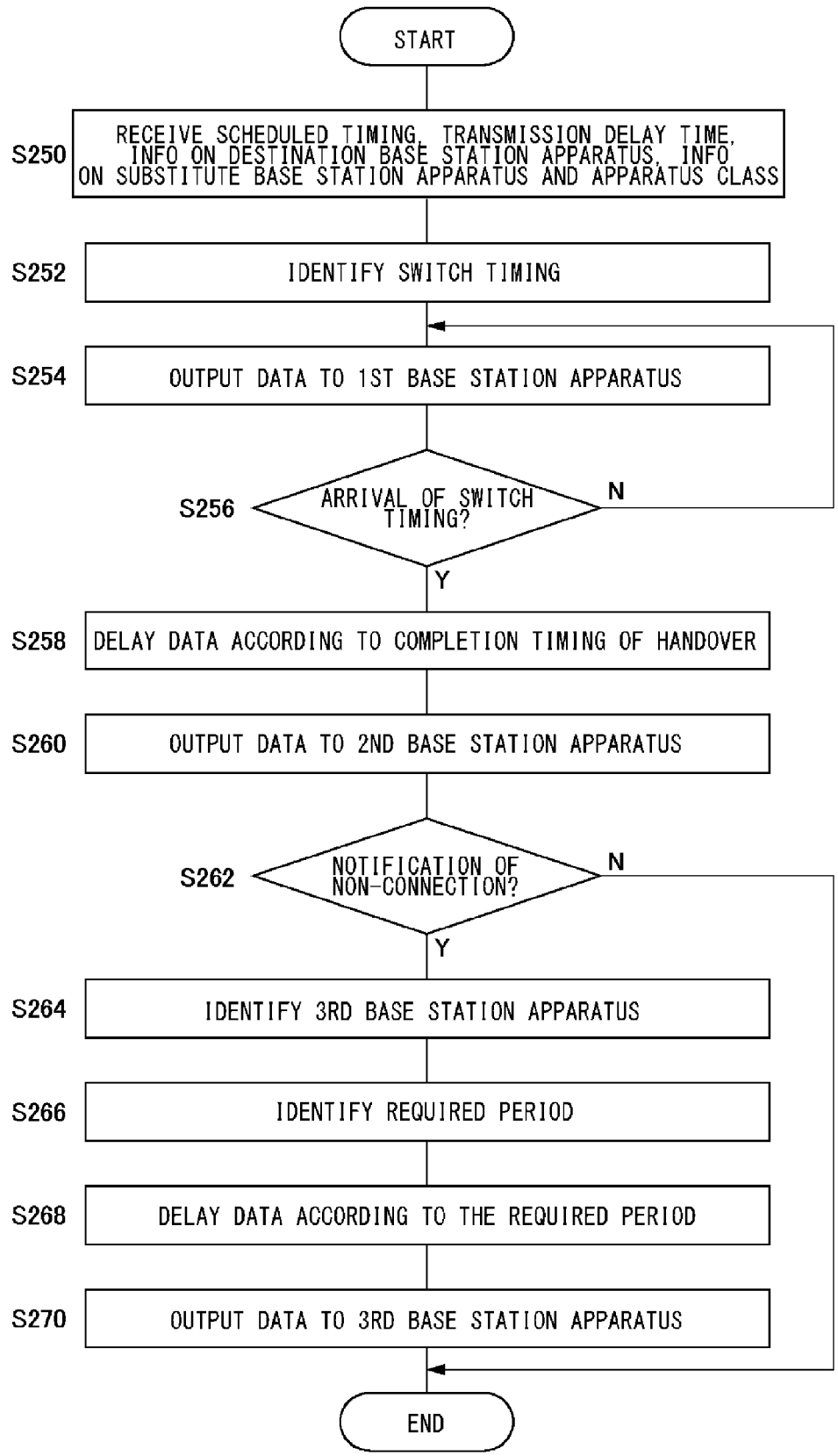
FIG. 11 is a flowchart showing a handover procedure by a PAC according to a modification of an exemplary embodiment.

FIG. 11 is a flowchart showing a handover procedure by the PAC 14 according to a modification of the exemplary embodiment. The second interface unit 32 receives a scheduled timing, transmission delay time, information on the destination base station apparatus 12, information on the substitute base station apparatus 12, and the apparatus class (S250). The time control unit 42 specifies a switch timing (S252). The second interface unit 32 outputs data to the first base station apparatus 12a (S254). Without the arrival of the switch timing (N of S256), the processing returns to Step 254. On the other hand, with the arrival of the switch timing (Y of S256), the second interface unit 32 delays data according to the completion timing of handover (S258) and then outputs data to the second base station apparatus 12b (S260).

Without the notification of non-connection (N of S262), the processing is terminated. With the notification of non-connection (Y of S262), the time control unit 42 identifies the third base station apparatus 12c as the substitute base station apparatus 12 (S264). Also, the time control unit 42 determines a required period (S266). The time control unit 42 delays the present time according to the required period (S268) so as to determine a restart timing. The second interface unit 32 outputs data to the third base station apparatus 12c in the restart timing (S270).

Figure 12:
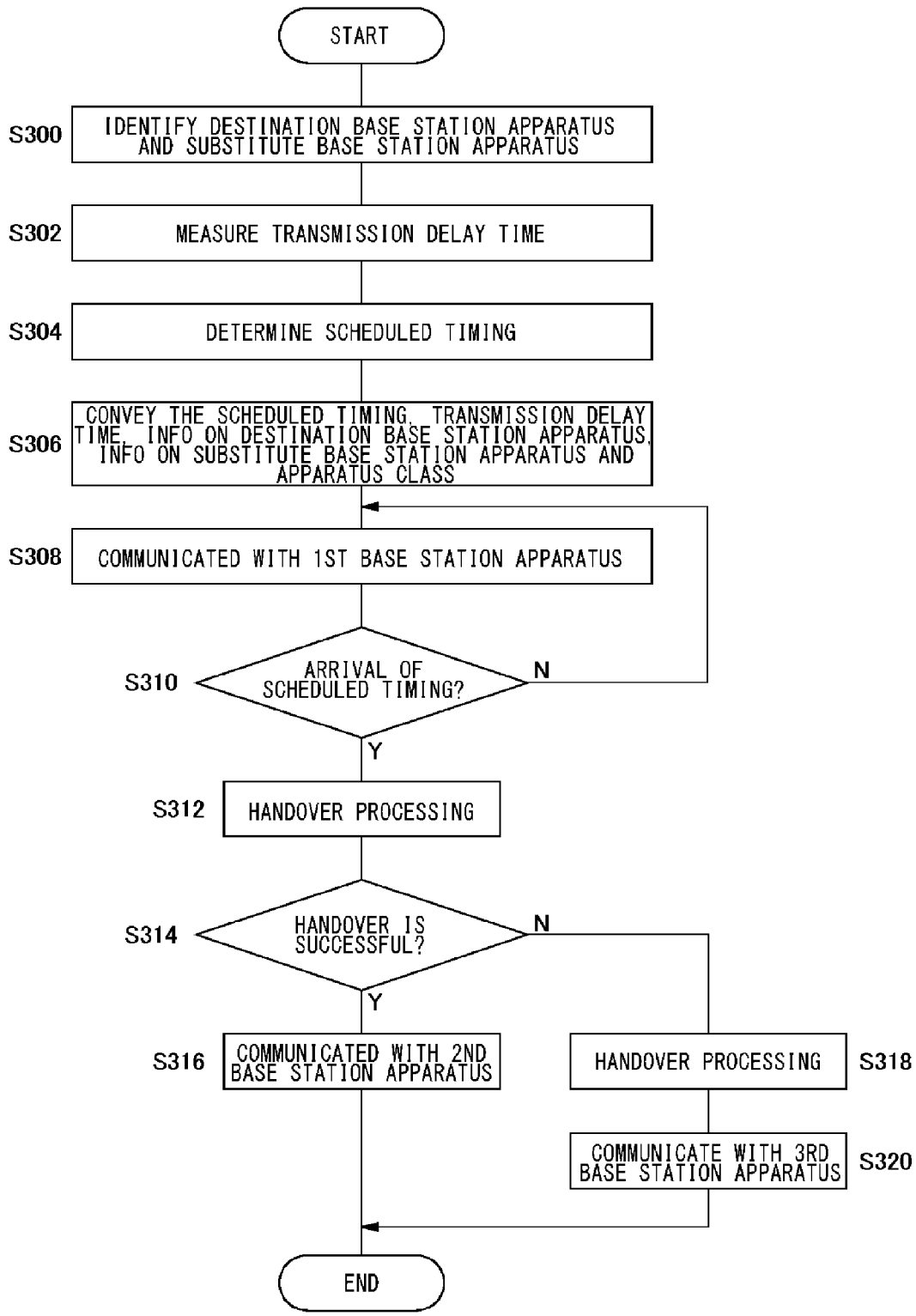
FIG. 12 is a flowchart showing a handover procedure by a terminal apparatus according to a modification of an exemplary embodiment.

FIG. 12 is a flowchart showing a handover procedure by the terminal apparatus 10 according to a modification of the exemplary embodiment. The radio unit 70 identifies the destination base station apparatus 12 and the substitute base station apparatus 12 (S300). The time control unit 84 measures a transmission delay time (S302). The time control unit 84 determines a scheduled timing (S304). The generator 86 conveys the scheduled timing and the transmission delay time, information on the destination base station apparatus 12, information on the substitute base station apparatus 12, and the apparatus class to the PAC 14 via the radio unit 70 (S306). The radio unit 70 executes a communication with the first base station apparatus 12*a* (S308).

Without the arrival of the scheduled timing (N of S310), the processing returns to Step 308. With the arrival of the scheduled timing (Y of S310), the radio unit 70 executes a handover processing (S312). If the handover is successful (Y of S314), the radio unit 70 will execute a communication with the second base station apparatus 12*b* (S316). If the handover is not successful (N of S314), the radio unit 70 will execute the handover processing (S318) and execute a communication with the third base station apparatus 12*c* (S320).

According to the exemplary embodiments of the present invention, the scheduled timing and the transmission delay time are received, so that the switch timing at which to switch to the destination base station apparatus can be estimated beforehand. Also, the switch timing is estimated beforehand, and the recipient of data is switched when said timing comes. Thus the data can be outputted before a notification is received from the base station apparatus. Since the data are outputted before the notification is received from the base station apparatus, the period of interrupted communication resulting from a handover can be shortened. Since the output of data is delayed according to the completion timing of handover, the possibility that the data may be discarded by the destination base station apparatus can be reduced. Since the possibility that data may be discarded in the base station apparatus is reduced, the handover can be executed smoothly. Also, since the transmission delay present in the communication with the PAC is measured, the reliability of transmission delay time can be enhanced.

Further, if it is detected that the connection between the destination base station apparatus and the terminal apparatus fails, data are outputted to the substitute base station apparatus. Thus, the length of time until when the transmission of data starts next can be reduced. Since the transmission of data is delayed based on the period required by the terminal apparatus, the data can be transmitted with the timing appropriate for the substitute base station apparatus. Since the information on the substitute base station apparatus is received beforehand, the restart timing for the substitute base station apparatus can be determined based on the required period in the event of handover failure. Since the restart timing is determined promptly, a communication interruption period can be shortened. Since the communication interruption period is shortened, user convenience can be improved. Since data to be transmitted to the substitute base station apparatus are the same as data transmitted to the destination base station apparatus, the continuity of data can be maintained. Since the required period is derived from the apparatus class, negotiations required for new information can be eliminated.

The present invention has been described based upon illustrative exemplary embodiments. These exemplary embodiments are intended to be illustrative only and it will be obvious to those skilled in the art that various modifications to constituting elements and processes could be developed and that such modifications are also within the scope of the present invention.

In the exemplary embodiments of the present invention, the radio scheme employed between the radio unit 50 of the base station apparatus 12 and the radio unit 70 of the terminal apparatus 10 is arbitrary. This should be considered as limiting and, for example, it may be an OFDMA method. In such a case, ranging processing may be performed between the terminal apparatus 10 and the base station apparatus 12. According to this modification, the present invention is applicable to various kinds of radio schemes.

In the exemplary embodiments of the present invention, equipment connected to a plurality of base station apparatuses 12 is the PAC 14. However, this should not be considered as limiting and, for example, a communication carrier gateway may replace the PAC 14. Or a relay server that determines a route of communication carriers may replace the PAC 14. According to this modification, the present invention is applicable to various kinds of equipment.

In the exemplary embodiments of the present invention, the time control unit 42 derives the switch timing by shifting the scheduled timing forward by the length of the transmission delay time. However, this should not be considered as limiting and, for example, the time control unit 42 may derive the switch timing in such a manner that the maximum data length (1500 bytes) is taken into account if the radio scheme is wireless LAN (Local Area Network) complied with IEEE 802.11a and the like. In this case, the time control unit 42 derives another switch timing by shifting the scheduled timing by the length of time during which the maximum data can be processed. If the another switch timing comes before the above-described switch timing, the time control unit 42 will take the another switch timing as the final switch timing.

Further, the time control unit 42 may derive the another switch timing as follows. The time control unit 42 estimates processing time from the length of packet signal that stores data, and derives another switch timing. Also, the time control unit 42 derives another switch timing, based on the length of packet signal and the current throughput. Here, the throughput may be derived on the assumption that the radio environment between the first base station apparatus 12*a* and the terminal apparatus 10 keeps the current condition until immediately before a handover. Also, the throughput may be derived on the assumption that the radio environment between the first base station apparatus 12*a* and the terminal apparatus 10 is worse than the current condition. If the terminal apparatus 10 and the base station apparatus 12 each has a link adaptation function, the throughput may be derived based on the minimum transmission rate. According to this modification, the switch timing can be derived accurately.

In the exemplary embodiments of the present invention, the terminal apparatus 10 conveys the completion timing to the PAC 14. However, this should not be considered as limiting and, for example, the PAC 14 may define beforehand a period of time required for a handover processing (this period will be hereinafter referred to as "handover period") without having the terminal apparatus 10 notify the PAC 14 of the completion timing. In such a case, the completion timing is derived by adding the handover period to the scheduled timing. According to this modification, the notification of completion timing by the terminal apparatus 10 can be eliminated.

In the exemplary embodiments of the present invention, the terminal apparatus 10 transmits the information on a substitute base station apparatus 12, to the PAC 14. However, this should not be considered as limiting and, for example, there may be a plurality of substitute base station apparatuses 12. In such a case, the terminal apparatus 10 assigns priority levels to the plurality of substitute base station apparatuses 12, according to the received power of control signal and so forth.

The terminal apparatus 10 attempts the handover to the substitute base station apparatuses 12 in descending order starting from a substitute base station apparatus 12 having the highest priority level. At the same time, the PAC 14 also attempts to send data to the substitute base station apparatuses in descending order starting from a substitute base station apparatus 12 having the highest priority level. According to this modification, the possibility that the handover may fail eventually can be reduced.

In the exemplary embodiments of the present invention, the terminal apparatus 10 transmits the information on a substitute base station apparatus 12 to the PAC 14 and then the PAC 14 transmits data to the substitute base station apparatus 12 when a connection failure is detected. However, this should not be considered as limiting and, for example, when the connection failure is detected, the switching control unit 44 may inform a plurality of base station apparatuses of the data. More specifically, the data are sent to the base station apparatuses located on the periphery of the source base station apparatus 12. According to this modification, the processing can be simplified.

While the exemplary embodiments and the modifications have been described using specific terms, such description is for illustrative purposes only, and it is to be understood that changes and variations may be further made without departing from the spirit or scope of the appended claims.

What is claimed is:

1. A control apparatus, comprising:
an input unit which receives a scheduled timing with which to execute a handover and a transmission delay time with a terminal apparatus, from the terminal apparatus via a source base station apparatus;
a sorting unit which sorts out original data, to be transmitted to the terminal apparatus, into first data to be transmitted via the source base station apparatus and second data to be transmitted via a destination base station apparatus, based on the scheduled timing and the transmission delay time received by the input unit; and
an output unit which outputs the first data sorted out by the sorting unit to the source base station apparatus and which outputs the second data sorted out thereby to the destination base station apparatus.

2. A control apparatus according to claim 1, further comprising an acquisition unit which acquires a scheduled completion timing of handover,
wherein the output unit delays an output of the second data based on the scheduled timing acquired by the acquisition unit.

3. A control apparatus according to claim 1, further comprising an execution unit which measures the transmission delay time with the terminal apparatus routed through the source base station apparatus.

4. A control apparatus according to claim 1, further comprising a detector which detects a failure of connection between the destination base station apparatus and the terminal apparatus,
wherein when the failure of connection is detected by the detector, the output unit outputs the second data to a next available destination base station apparatus.

5. A control apparatus according to claim 4, wherein the input unit further receives information on the destination base station apparatus, at least one next available destination base station apparatus and a period required for the handover by the terminal apparatus, from the terminal apparatus,
wherein the output unit identifies the next available destination base station apparatus from the information received by the input unit, and after the failure of connection is detected by the detector, the output unit delays an output of the second data based on the period required for the handover.

6. A control apparatus according to claim 1, further comprising a detector which detects a failure of connection between the destination base station apparatus and the terminal apparatus,
wherein when the failure of connection is detected by the detector, the output unit informs a plurality of base station apparatuses of the second data.

7. A terminal apparatus, comprising:
a measurement unit which measures a transmission delay time with a control apparatus routed through a source base station apparatus;
a determining unit which determines a scheduled timing with which to execute a handover, based on the transmission delay time measured by the measurement unit;
a notification unit which conveys the scheduled timing, with which to execute a handover, determined by the determining unit and the transmission delay time measured by the measurement unit to the control apparatus via the source base station apparatus; and
a communication unit which executes communication with the source base station apparatus up to the scheduled timing and with a destination base station apparatus after the scheduled timing.

8. A terminal apparatus according to claim 7, wherein the determining unit further determines the destination base station apparatus and at least one substitute destination base station,
wherein the notification unit further notifies information on the destination base station apparatus and the at least one substitute destination base station determined by the determining unit to the control apparatus via the source base station apparatus.

9. A method for controlling a handover, comprising:
receiving a scheduled timing with which to execute the handover and a transmission delay time with a terminal apparatus, from the terminal apparatus via a source base station apparatus;
sorting out original data, to be transmitted to the terminal apparatus, into first data to be transmitted via the source base station apparatus and second data to be transmitted via a destination base station apparatus, based on the scheduled timing and the transmission delay time received by the inputting; and
outputting the first data sorted out by the sorting to the source base station apparatus and outputting the second data sorted out thereby to the destination base station apparatus.

10. A method for controlling a handover, comprising:
measuring a transmission delay time with a control apparatus routed through a source base station apparatus;
determining a scheduled timing with which to execute the handover, based on the transmission delay time measured by the measuring;
conveying the scheduled timing, with which to execute the handover, determined by the determining and the transmission delay time measured by the measuring to the control apparatus via the source base station apparatus; and
executing communication with the source base station apparatus up to the scheduled timing and with a destination base station apparatus after the scheduled timing.

* * * * *